(12) United States Patent
Schroder et al.

(10) Patent No.: US 6,770,205 B1
(45) Date of Patent: Aug. 3, 2004

(54) METHOD FOR TREATMENT OF POLLUTANTS USING IRON-IMPREGNATED, CARBON-COATED, SILICA SAND

(76) Inventors: David Lawrence Schroder, P.O. Box 62, Sylvania, OH (US) 43560; Daniel William Oberle, 5114 Maple Dr., Sylvania, OH (US) 43560; James R. Burns, 5848 Wood Valley, Haslett, MI (US) 48840; Thomas Barton Cole, 5804 MacKenzie Dr., Kewadin, MI (US) 49648

( * ) Notice: Subject to any disclaimer, the term of this patent is extended or adjusted under 35 U.S.C. 154(b) by 0 days.

(21) Appl. No.: 10/213,637

(22) Filed: Aug. 7, 2002

(51) Int. Cl.⁷ ................................................. C02F 1/28
(52) U.S. Cl. ........................... 210/668; 134/7; 210/679; 210/694; 210/747; 405/128.5
(58) Field of Search ................................. 210/668, 679, 210/694, 747, 757; 134/7; 405/128.5, 128.75; 588/248

(56) References Cited

U.S. PATENT DOCUMENTS

| | | | |
|---|---|---|---|
| 3,640,821 A | 2/1972 | Sweeny et al. | 210/749 |
| 3,737,384 A | 6/1973 | Sweeny et al. | 210/754 |
| 3,803,033 A | * 4/1974 | Sutherland | 210/673 |
| 4,219,419 A | 8/1980 | Sweeny | 210/754 |
| 4,382,865 A | 5/1983 | Sweeny | 210/743 |
| 5,266,213 A | 11/1993 | Gillham | 210/747 |
| 5,362,394 A | 11/1994 | Blowes et al. | 210/617 |
| 5,362,402 A | 11/1994 | Haitko et al. | 210/757 |
| 5,514,279 A | 5/1996 | Blowes et al. | 210/617 |
| 5,534,154 A | 7/1996 | Gillham | 210/668 |
| 5,750,036 A | 5/1998 | Sivavec | 210/747 |
| 5,789,649 A | 8/1998 | Batchelor et al. | 588/206 |
| 5,868,941 A | * 2/1999 | Gillham et al. | 210/747 |
| 5,876,606 A | 3/1999 | Blowes et al. | 210/679 |
| 5,911,882 A | * 6/1999 | Benjamin et al. | 210/679 |
| 5,975,798 A | 11/1999 | Liskowitz et al. | 405/128 |

OTHER PUBLICATIONS

Robert W. Gillham and Stephanie F. O'Hannesin, Enhanced Degradation of Halogenated Aliphatics by Zero–Valent Iron, Groundwater, vol. 32, No. 6, pp. 959–67.

Keith H. Sweeny, The Reductive Treatment of Industrial Wastewaters, American Institute of Chemical Engineers, Symposium Series 209, Water–1980, Ed. G.F. Bennett, vol. 77, pp. 67–78.

Taeyoon Lee and Craig H. Benson, Using Waste Foundry Sands as Reactive Media in Permeable Reactive Barriers, University of Wisconsin–Madison, Jan. 15, 2002.

* cited by examiner

Primary Examiner—Ivars C. Cintins

(57) ABSTRACT

A method for pollutants using an iron-impregnated, carbon-coated silica sand with the iron containing between to and 16 percent silicon. The invention provides an improved method for performing remediation of pollutants by dissolved metal reactions while minimizing interferences caused by oxide fouling from oxygen in the water or in the atmosphere. The invention further provides an inexpensive media with high surface area for adsorptive fixation and reductive treatment that yields higher than anticipated reaction kinetics utilizing only low concentrations of iron in the media.

18 Claims, 3 Drawing Sheets

METHOD FOR TREATMENT OF POLLUTANTS USING IRON-IMPREGNATED, CARBON-COATED, SILICA SAND

CROSS-REFERENCE TO RELATED APPLICATIONS

Not Applicable.

STATEMENT REGARDING FEDERAL RESEARCH AND DEVELOPMENT

Not Applicable.

BACKGROUND

Dissolved metal reduction reactions have been used in the field of organic chemistry for 150 years. This type of reaction involves placing a compound in contact with a reductive metal in order to chemically reduce the compound. Typical dissolved metal reduction reactions involve the use of lithium, sodium or aluminum which have strong electrode potentials of 3.03, 2.71 and 1.66 volts, respectively. It would be desirable to utilize these metals for reductive treatment of organic and inorganic pollutants for remediation of groundwater and soils. However, these metals reduce water into hydrogen gas and hydroxide anions which interfere with chemical reduction of pollutants by fouling the surface of the metal with a film of hydrogen gas and hydroxide precipitates. Therefore, much attention has been focused on identifying alternate metals that are capable of achieving beneficial reductive reactions with minimal formation of hydrogen gas and hydroxide precipitates at the metal surface.

The periodic table contains 78 metals that may be evaluated for use in dissolved metal reduction reactions of pollutants. The six alkali metals and six alkaline earth metals all have electrode potentials that exceed 0.83 volts. Therefore, these metals are unsuitable for long-term reductive performance because they reduce water into hydrogen gas and hydroxide which results in fouling at the surface of the metal. Twelve additional transition metals also have electrode potentials that exceed 0.83 volts, making them also unsuitable for use in remedial applications. Other transition metals are cathodic and have an electrode potential less than negative 0.5 volts. These metals include palladium, mercury, osmium, silver, gold, iridium, platinum and technetium. These metals are highly resistant to oxidation and would not be able to spontaneously reduce pollutants in groundwater or soils. Finally, the list of 28 inner-transition metals cannot be used due to high reactivity or radioactive decay. These data show that more than 75 percent of the metals in the periodic table are unsuitable or incapable of being used for dissolved metal reductive reactions for remedial purposes. Of the few remaining suitable metals that may be used most of the remedial experimentation has focused on the use of iron or zinc due to the low toxicity and high availability of these metals.

Initial work in the remedial field of dissolved metal reduction reactions was pioneered by K. H. Sweeny in 1972. Sweeny used zinc metal to reductively dechlorinate pesticides in the laboratory in a process later patented in 1972 (U.S. Pat. No. 3,640,821). In 1980, Sweeny expanded his use of remedial dissolved metal reduction to include the use of iron for reduction of chlorinated solvents in industrial waste water (Sweeny, K. H., *The Reductive Treatment of Industrial Wastewaters*, AMERICAN INSTITUTE OF CHEMICAL ENGINEERS, SYMPOSIUM SERIES 209, WATER-1980, Ed. G. F. Bennett, Vol. 77, pp 67–78).

In 1992, Gillham and O'Hannesin began to further investigate the use of iron and zinc fines for in-situ remedial treatment applications after they observed such reductive treatment occurring in monitoring wells constructed of galvanized steel. Gillham and O'Hannesin extended their studies to include bodies of metal such as brass and copper but found that these metals were substantially less effective than iron and zinc (Gillham, R. W. and O'Hannesin, S. F., *Enhanced Degradation of Halogenated Aliphatics by Zero-Valent Iron*, GROUNDWATER, Vol. 32, pp 958–967). Gillham and O'Hannesin also reported that no degradation of chlorinated solvents was observed when the body of metal used for treatment was stainless steel This presents a fictional issue because metals such as zinc and iron perform well for reductive dechlorination but are subject to oxide fouling when exposed to water and oxygen. On the other hand, metal alloys such as stainless steel are resistant to oxide fouling, but they are non-functional for use in dissolved metal reduction reactions. In 1992, Robert Gillham filed a patent that involved the use of metal for subsurface remediation where the body of metal is handled in a manner that prevents substantially all traces of oxygen from reaching an anaerobic portion of the body of metal (U.S. Pat. No. 5,266,213). It would be desirable to generate a metallic surface with an electrode potential significant enough to reduce pollutants that is also resistant to oxygen corrosion under neutral or slightly acidic groundwater conditions.

SUMMARY

This invention describes a method for reductive treatment of pollutants in groundwater, soil, waste or water using an iron-impregnated, carbon-coated silica sand. The iron contains between 1.7 and 4.5 percent carbon and between 2 and 16 percent silicon to prevent aerobic corrosion at the surface of the metal. The silica sand also contains up to four percent carbon by weight to facilitate adsorptive fixation and retardation of pollutants at the surface of the iron-impregnated sand.

Objects and Advantages

Accordingly, several objects and advantages of our invention are:

(a) the invention provides a method of performing reductive remediation with dissolved metal reactions while minimizing interferences caused by oxide fouling due to dissolved oxygen in water or exposure to oxygen in the atmosphere;

(b) the invention provides a media with high surface area for adsorptive fixation and reductive treatment;

(c) the invention provides higher than anticipated reaction kinetics while utilizing only low concentrations of iron in the media; and (d) the invention provides an inexpensive media for treatment of pollutants since the matrix is primarily composed of sand.

Further objects and advantages of our invention will become apparent from a consideration of the drawings and ensuing description.

BRIEF DESCRIPTION OF THE DRAWINGS

A complete understanding of the present invention may be obtained by reference to the accompanying drawing, when considered in conjunction with the subsequent detailed description.

DESCRIPTION OF THE INVENTION

Figure 1:
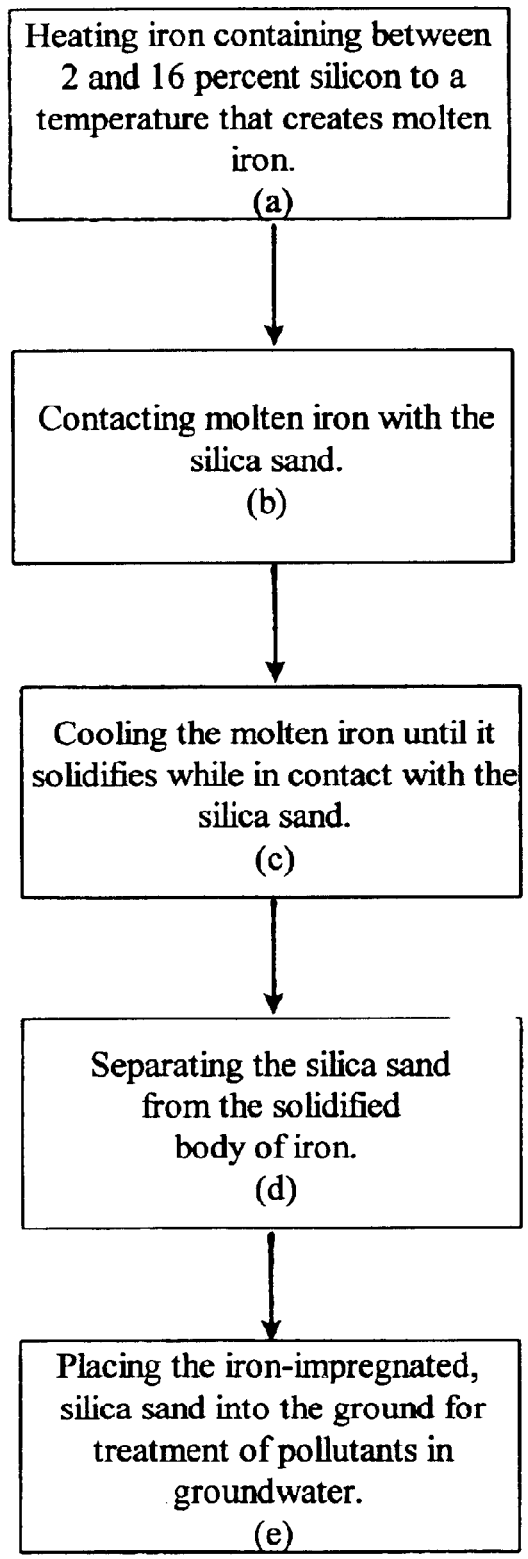
FIG. 1 is a process flow chart describing how the disclosed invention is used for treating pollutants in groundwater in a below-ground application.
Figure 2:
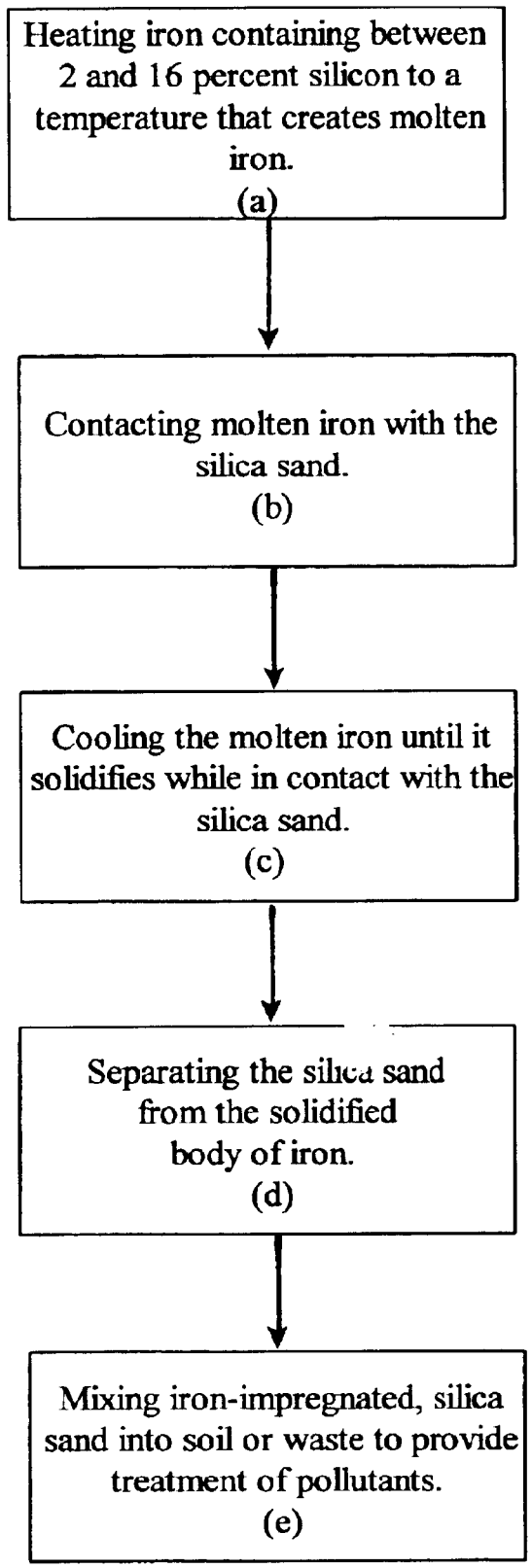
FIG. 2 is a process flow chart describing how the disclosed invention is used for treating pollutants in soil or wastes.
Figure 3:
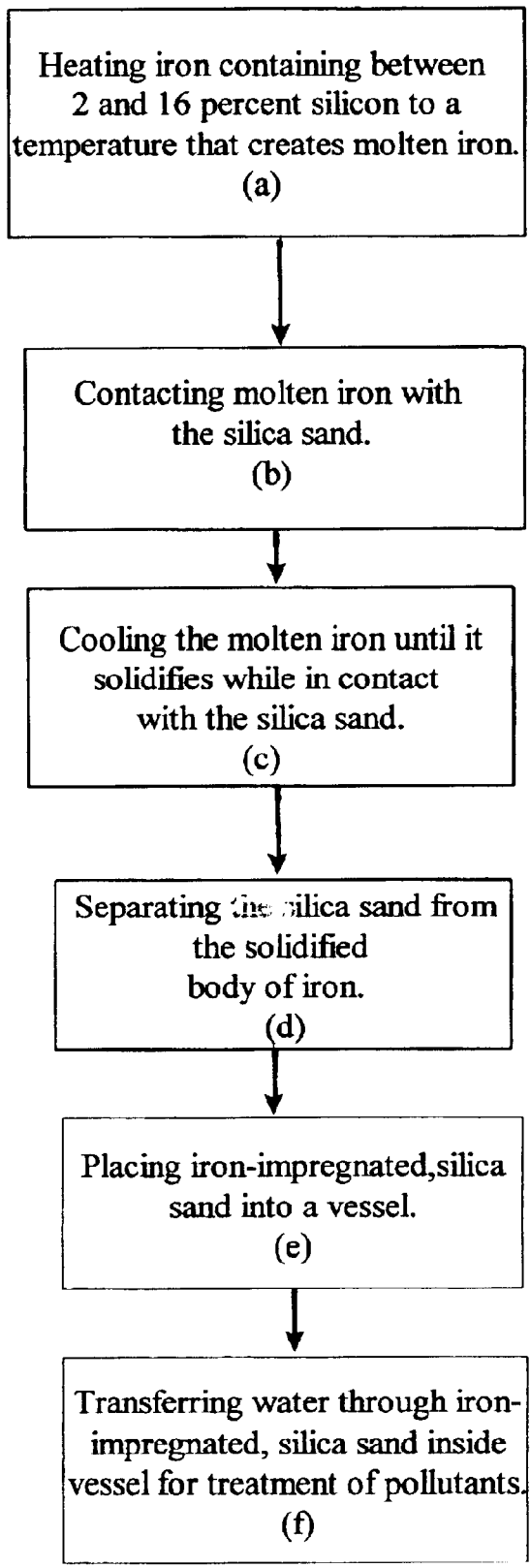
FIG. 3 is a process flow chart describing how the disclosed invention is used for treating pollutants in water in a vessel.

Iron-impregnated, carbon-coated silica sand is prepared by placing molten iron containing between 1.7 and 4.5 percent carbon and between two and 16 percent silicon in contact with a carbon-coated silica sand and allowing the iron to thermally fuse onto the surface of the sand matrix. Silicon is added to the iron to improve the anti-corrosion properties of the iron. The silicon is typically added at concentration ranging from two to four percent but up to 16 percent may be used to create a high-silicon iron that is highly resistant to oxide fouling. The silicon within the iron, plus extra silicon that may diffuse into the iron from the silica sand during thermal fusion, creates an iron-impregnated surface on the sand that tends to resist atmospheric corrosion and attack by neutral waters and soil.

After the molten iron is contacted with the silica sand, the iron is allowed to cool and solidify. This creates an iron that is highly conductive due to the formation of ferritic iron that has graphite flakes throughout the iron. The graphite and ferritic iron both serve as electrical conductors for the transfer of electrons during reductive surface reactions. If the molten iron is allowed to cool very slowly, pearlitic iron is formed. Pearlitic iron is more resistant to atmospheric oxidation corrosion than ferritic iron. Therefore, slower cooling of the iron without a quench is preferred. Magnesium may also be added to the molten iron so the graphite in the iron forms in the shape of nodules or spheres rather than graphite flakes.

After the iron has sufficiently cooled and solidified, the silica sand is scoured from the surface of the solidified iron by a means of mechanical abrasion. A simplistic method of removing the sand involves blasting the surface of the iron with steel shot. The segregated sand contains approximately two percent iron by weight as a thermally fused coating on the surface of the sand. Because the iron-impregnated surface contains silicon, the material is resistant to oxidation. The surface of the iron is not easily fouled by dissolved oxygen in water or by exposure to oxygen in the atmosphere.

The silica sand provides a high concentration of active sites per weight for thermal fusion of the iron. However, carbon is also added to the sand prior to thermal fusion. The carbon serves as a promoter to enhance physical and chemical adsorptive functions of the reactive media for fixation of pollutants. The iron-impregnated, carbon-coated silica sand, once prepared, may be used to treat a number of different pollutants by electron transfer reactions or adsorptive fixation reactions which occur at the spongy surface of the reactive matrix.

Once the iron-impregnated, carbon-coated silica sand has been prepared, it may be placed below the ground surface for treatment of pollutants in groundwater, mixed with soils or wastes for treatment of multi-phase pollutants, or placed into a vessel for treatment of pollutants in water. For purposes of this disclosure, a vessel is described as any void space that can hold the iron-impregnated, carbon-coated, silica sand and the polluted water for a sufficient period of time to allow for treatment of pollutants. A vessel may therefore include, but is not limited to, a pit, sump, basin, tank, lined lagoon, or even an unlined lagoon that allows for treatment of pollutants before the water infiltrates into the soils.

Although disclosed and described with respect to the depicted schematic arrangements of the preferred embodiment of the present invention, it should be appreciated that other, equivalent embodiments will be apparent to those skilled in the art and are within the scope of the invention as set forth in the foregoing disclosure and appended claims and drawing figures.

Experiments

A washed Lake Superior silica sand in the size range of 0.1 to 0.5 millimeters was mixed with four percent powdered coal to coat the sand with carbon. Molten iron was prepared containing approximately 3.7 percent carbon and between two and three percent silicon by weight. The silicon was added to provide anti-corrosion properties when the iron is exposed to oxygen in the water or in the air. The molten iron was placed onto the carbon-coated silica sand inside a mold and the iron was allowed to cool and solidify without quenching. The solid body of iron was removed from the sand after cooling and the sand particles were scoured from the solidified iron by bombarding the iron with a 0.5 to 0.6 millimeter steel shot to remove the majority of the sand. This was followed by a second blast using a 0.3 millimeter steel shot. The sand and iron shot were separated using a density separation process to isolate the iron-impregnated, carbon-coated sand from the spent steel shot. A sample of the iron-impregnated, carbon-coated silica sand was analyzed at Michigan State University using an electron microscope and x-ray fluorescence. The results confirmed that iron had been thermally fused onto the surface of the carbon-coated silica sand. Analyses of the iron-impregnated, carbon-coated silica sand showed that the sand contained approximately two percent iron by weight as fused iron.

Samples of the iron-impregnated, carbon-coated silica sand and the separated spent steel shot were tested for reactive kinetics to evaluate the performance of both types of media for reductive treatment. Trichloroethylene and cis-1,2-dichloroethene were selected as pollutants for this testing since reductive kinetics for these compounds had already been determined by others in pure iron batch tests. Forty grams of the iron-impregnated, carbon-coated silica sand were exposed to atmospheric conditions for seven days prior to performing the bench scale testing to confirm resistance to atmospheric oxidation. The iron-impregnated, carbon-coated sand was then placed into a 40-milliliter vial and the vial was filled with water that was impacted with trichloroethylene and cis-1,2-dichloroethene. This resulted in an iron-to-water mass ratio of 0.053 grams of iron per gram of water.

A second 40-milliliter vial was filled with 80 grams of steel shot and 28 milliliters of water, resulting in an iron-to-water mass ratio of 2.86 grams of iron per gram of impacted water. The mass ratio of iron in the steel shot sample was therefore 54 times greater than that in the iron-impregnated, carbon-coated, silica sand sample.

A third sample was prepared by placing 40 grams of carbon-coated silica sand without iron-impregnation into a 40-milliliter vial with 15 milliliters of impacted water to evaluate adsorptive effects of the carbon. Finally, a fourth sample was prepared using 40 grams of clean silica sand without carbon or iron-impregnation in contact with 15 milliliters of impacted water to serve as a control group. The samples were analyzed over a period of two weeks to evaluate the adsorptive and reductive effects of the iron-impregnated, carbon-coated silica sand. The steel shot was evaluated to determine how residual steel shot in the sample might effect the properties of the treatment media if left in the iron-impregnated carbon-coated, silica sand after processing.

The results of the testing showed that the iron-impregnated, carbon-coated silica sand provided sorptive and reductive treatment for pollutants. The iron-impregnated, carbon-coated silica sand chemically reduced trichloroethylene and cis-1,2-dichloroethene at a psuedo first order reaction rate of 0.34 days$^{-1}$. Although the steel shot contained a much higher mass ratio of iron to water, the steel shot only provided reductive kinetics for trichloroethylene and cis-1,2-dichloroethene of 0.04 days$^{-1}$ and 0.006 days$^{-1}$, respectively. Therefore, the iron-impregnated, carbon-coated, silica sand had a psuedo first order reaction rate constant 8 to 57 times faster than the steel shot despite the fact that the ratio of iron to water for the steel shot was 54 times higher than the iron-impregnated, carbon-coated, silica sand.

Prior batch studies by Gillham and O'Hannesin (Gillham, R. W. and O'Hannesin, S. F., *Enhanced Degradation of Halogenated Aliphatics by ZeroValent Iron*, GROUNDWATER, Vol 32, No. 6, pp. 959–67) using pure powdered iron at an iron-to-water mass ratio of 0.26 resulted in psuedo first order reaction rates of 1.2 days$^{-1}$ and 0.038 days$^{-1}$ for trichloroethylene and cis-1,2-dichloroethene, respectively. The reaction kinetics for destruction of trichloroethylene in the Gillham and O'Hannesin batch test were 3.5 times faster than the kinetics of the iron-impregnated, carbon-coated silica sand, but five times more iron was required to achieve this rate. The reaction kinetics for destruction of cis-1,2-dichloroethene in the sham and O'Hannesin batch test were nine times slower than the kinetics of the iron-impregnated sand, even though five times more iron was used in the Gillham and O'Hannesin batch test. These data show that the iron-impregnated, carbon-coated silica sand can provide rapid reductive treatment of pollutants at rates that are comparable to or better than that of pure iron, even when the iron-impregnated, carbon-coated, silica sand is exposed to atmospheric conditions prior to use.

Subsequent testing showed that the iron-impregnated, carbon-coated silica sand also performed well or treatment of other pollutants included hexavalent chromium, vinyl chloride, tetrachloroethene, 1,1-dichloroethene and other organics and heavy metals. In particular, the iron-impregnated, carbon-coated silica sand was very effective in treating 1,1,1-trichloroethane, providing a psuedo first order reaction rate greater than 1.4 days$^{-1}$ using only an iron-to-water mass ratio of 0.053. In addition, significant reduction in pollutant concentrations in soil were observed over a two-week period when the iron-impregnated, carbon-coated silica sand was mixed with soil and compared to a control sample mixed only with pure silica sand.

Conclusion, Ramifications, and Scope

Accordingly, the reader will see that the present invention provides an improved method for performing remediation of pollutants with dissolved metal reactions while minimizing interferences caused by oxide fouling due to dissolved oxygen in water or exposure to oxygen in the atmosphere. The invention provides an inexpensive media with high surface area for adsorptive fixation and reductive treatment that yields higher than anticipated reaction kinetics utilizing only low concentrations of iron in the media. Further objects and advantages of our invention will become apparent from a consideration of the drawings and ensuing description.

What is claimed is:

1. A method for treating pollutants in groundwater comprising the steps of:

(a) heating iron containing between 2 and 16 percent silicon to a temperature that creates molten iron, (b) mixing up to four percent carbon into a silica sand to create a carbon-coated silica sand, (c) contacting said molten iron with said carbon-coated silica sand, (d) cooling said iron so said iron solidifies while in contact with said carbon-coated silica sand, (e) separating said carbon-coated silica sand from the solidified body of iron to generate a carbon-coated silica sand with an iron impregnated surface, and (f) placing said carbon-coated silica sand with iron impregnated surface into the ground for treatment of pollutants in the groundwater.

2. The method in claim 1, wherein said iron is ferritic or pearlitic.

3. The method in claim 1, wherein said silica sand is in the size range of 0.1 to 0.5 millimeters.

4. The method in claim 1, wherein said carbon-coated silica sand is separated from said solidified body of iron by bombardment of said solidified body of iron with steel shot.

5. The method in claim 4, wherein said bombardment with said steel shot is performed in two stages using progressively smaller shot.

6. The method in claim 1, wherein said carbon-coated silica sand with iron impregnated surface is placed into said groundwater to provide adsorptive fixation of said pollutants dissolved in said groundwater.

7. A method for treating pollutants in soil or waste comprising the steps of:

(a) heating iron containing between 2 and 16 percent silicon to a temperature that creates molten iron, (b) mixing up to four percent carbon into a silica sand to create a carbon-coated silica sand, (c) contacting said molten iron with said carbon-coated silica sand, (d) cooling said iron so said iron solidifies while in contact with said carbon-coated silica sand, (e) separating said carbon-coated silica sand from the solidified body of iron to generate a carbon-coated silica sand w an iron impregnated surface, and (f) mixing said carbon-coated silica sand with iron impregnated surface into said soil or said waste to provide treatment of pollutants.

8. The method in claim 7, wherein said iron is ferritic or pearlitic.

9. The method in claim 7, wherein said silica sand is in the size range of 0.1 to 0.5 millimeters.

10. The method in claim 7, wherein said carbon-coated silica sand is separated from said solidified body of iron by bombardment of said solidified body of iron with steel shot.

11. The method in claim 10, wherein said bombardment with said steel shot is performed in two stages using progressively smaller shot.

12. The method in claim 7, wherein said carbon-coated silica sand with iron impregnated surface is mixed into said soil or said waste to provide adsorptive fixation of said pollutants.

13. A method for treating pollutants in water comprising the steps of;
(a) heating iron containing between 2 and 16 percent silicon to a temperature that creates molten iron,
(b) mixing up to four percent carbon into a silica sand to create a carbon-coated silica sand,
(c) contacting said molten iron with said carbon-coated silica sand,
(d) cooling said iron so said iron solidifies while in, contact with said carbon-coated silica sand,
(e) separating said carbon-coated silica sand from the solidified body of iron to generate a carbon-coated silica sand with an iron impregnated surface,
(f) placing said carbon-coated silica sand with iron impregnated surface into a vessel; and
(g) transferring said water through said carbon-coated silica sand with iron impregnated surface inside said vessel for treatment of pollutants.

14. The method in claim 13, wherein said iron is ferritic or pearlitic.

15. The method in claim 13, wherein said silica sand is in the size range of 0.1 to 0.5 millimeters.

16. The method in claim 13, wherein said carbon-coated silica sand is separated from said solidified body of iron by bombardment of said solidified body of iron with steel shot.

17. The method in claim 16, wherein said bombardment with said steel shot is performed in two stages using progressively smaller shot.

18. The method in claim 13, wherein said carbon-coated silica sand with iron impregnated surface is placed into said vessel to provide adsorptive fixation of said pollutants dissolved in said water.

* * * * *